US008469240B2

(12) United States Patent  (10) Patent No.: US 8,469,240 B2
Wellman  (45) Date of Patent:  Jun. 25, 2013

(54) DISPENSING FLUIDS FROM CONTAINERS USING SELF CLOSING VALVE, TYPICALLY DUCKBILL TYPE VALVE

(75) Inventor: Craig John Wellman, Ingleburn (AU)

(73) Assignee: Sophinity Pty Ltd, Ingleburn, NSW (AU)

(*) Notice: Subject to any disclaimer, the term of this patent is extended or adjusted under 35 U.S.C. 154(b) by 965 days.

(21) Appl. No.: 11/575,787

(22) PCT Filed: Oct. 11, 2005

(86) PCT No.: PCT/AU2005/001578
§ 371 (c)(1),
(2), (4) Date: Jul. 25, 2007

(87) PCT Pub. No.: WO2006/105574
PCT Pub. Date: Oct. 12, 2006

(65) Prior Publication Data
US 2008/0061089 A1  Mar. 13, 2008

(30) Foreign Application Priority Data
Oct. 11, 2004  (AU) .............................. 2004905861

(51) Int. Cl.
B65D 35/38  (2006.01)
(52) U.S. Cl.
USPC .................. 222/494; 222/544; 222/541.3
(58) Field of Classification Search
USPC ......... 222/490, 491, 494, 92, 153.05, 153.06, 222/153.07, 544–546, 563, 541.3, 541.4; 137/846, 847
See application file for complete search history.

(56) References Cited

U.S. PATENT DOCUMENTS

| | | | |
|---|---|---|---|
| 1,908,584 A * | 5/1933 | Weirich .................. | 222/491 |
| 1,964,860 A * | 7/1934 | Rabe et al. ............. | 222/490 |
| 1,977,227 A | 10/1934 | Berendt | |
| 2,128,752 A * | 8/1938 | Lentine ................. | 222/490 |
| 2,188,191 A * | 1/1940 | Roos .................... | 222/490 |
| 2,743,852 A * | 5/1956 | Alberdi, Jr. ........... | 222/494 |
| 2,792,149 A | 5/1957 | Lutz | |
| 4,139,124 A | 2/1979 | Ferrante | |
| 5,234,138 A | 8/1993 | De Laforcade | |
| 5,842,618 A | 12/1998 | Julemont et al. | |
| 5,950,881 A | 9/1999 | Sherman et al. | |
| 6,223,956 B1 | 5/2001 | Albers | |
| 6,357,949 B1 | 3/2002 | Schwartzman | |
| 2002/0125272 A1 | 9/2002 | Sekendur | |
| 2006/0037977 A1* | 2/2006 | Eimer .................... | 222/494 |

FOREIGN PATENT DOCUMENTS

| | | |
|---|---|---|
| CA | 2173524 | 10/1996 |
| DE | 38 09 959 | 10/1989 |
| DE | 196 46 060 | 4/1998 |
| DE | 298 20 208 | 2/1999 |

(Continued)

*Primary Examiner* — Paul R Durand
*Assistant Examiner* — Robert Nichols, II
(74) *Attorney, Agent, or Firm* — Ladas & Parry LLP

(57) ABSTRACT

A dispenser for dispensing a fluid from a container T having an inlet for mounting to the container so as to receive therethrough the fluid, and an outlet which is adapted to open to release fluid therefrom when a predetermined pressure is applied to the fluid in the dispenser at the outlet, and to close to retain fluid in the dispenser at a pressure less than the predetermined pressure. A wall of resilient material at the outlet has one or more panels of elastomeric material provided therein, each panel being deformable to enable the adjacent resilient material to flex at the predetermined pressure and thus enable the outlet to open.

24 Claims, 10 Drawing Sheets

FOREIGN PATENT DOCUMENTS

| | | |
|---|---|---|
| EP | 0 442 379 | 8/1991 |
| EP | 0 947 440 | 10/1999 |
| EP | 1 228 975 | 8/2002 |
| GB | 2 148 863 | 6/1985 |
| JP | 2000-142604 | 5/2000 |
| JP | 2004-250018 | 9/2004 |

* cited by examiner

DISPENSING FLUIDS FROM CONTAINERS USING SELF CLOSING VALVE, TYPICALLY DUCKBILL TYPE VALVE

TECHNICAL FIELD

A dispenser for dispensing a fluid from a container is disclosed. The dispenser comprises a self-closing valve and optionally a tamper evident hermetic seal. The dispenser is particularly though not exclusively adapted for dispensing viscous fluids from pliable containers such as tubes and bottles.

BACKGROUND ART

Viscous fluids such as cosmetic creams and pastes (including toothpaste), medicament creams and pastes, soaps and detergents, food pastes and sauces, adhesives and glues, fillers and binding agents etc are often stored in and dispensed from pliable containers, especially tubes, bottles, tubs etc. Such a container may comprise a dispenser component having one end mounted to an open end of the container. The dispenser may have a spout at an opposing end from which the fluid is released. The fluid can be caused to be released by pressuring the tube interior (eg. by manually squeezing a pliable wall thereof) which applies pressure to the fluid and forces it into the dispenser component, to ultimately issue forth out of the spout.

The spout of the dispenser component can be closed by a screw cap, a flip-top lid or other similar closure device. The use of such closure devices may result in a build-up of fluid around the sealing area making them difficult to close. If not properly closed by a user, then fluid in the dispenser component can degrade due to oxygen ingress or be inadvertently released from the spout, leading to mess and/or cap or lid seizure or fastening. Also, if the fluid itself is hazardous, improper closing can sometimes present a hazard.

U.S. Pat. No. 1,977,227 discloses a self closing paste tube. The head of the tube comprises four metal sections coated by rubber to define an outlet that automatically closes upon removal of a squeezing pressure upon-the tube.

U.S. Pat. No. 2,792,149 discloses a collapsible tube for toothpaste. A dispensing head is attached to the tube that opens when pressure is applied to the tube and closes after that pressure is released. The head is formed from a single piece of plastic material.

U.S. Pat. No. 4,139,124 discloses a liquid dispensing container. The container includes a self closing conduit, which is urged closed by a plurality of elongate beads surrounding the conduit.

SUMMARY

In a first aspect there is provided a dispenser for dispensing a fluid from a container, the dispenser comprising:
an inlet for mounting to the container so as to receive therethrough the fluid; and
an outlet which is adapted to open to release fluid therefrom when a predetermined pressure is applied to the fluid in the dispenser at the outlet, and to close to retain fluid in the dispenser at a pressure less than the predetermined pressure;
wherein a wall of resilient material at the outlet has one or more panels of elastomeric material provided therein, the or each panel being deformable to enable the adjacent resilient material to flex at the predetermined pressure and thus enable the outlet to open.

The provision of one or more elastomeric material panels has been found to enhance both opening and self-closing of the outlet, as the panel(s) co-operate with the resilient material during both outlet opening and closing. A dispenser configured in this manner can also be easily and rapidly manufactured (eg. by co- or bi-moulding).

Also, the dispenser can automatically open when the predetermined pressure of fluid is reached at the dispenser outlet, and can automatically close when the fluid pressure falls below that level. Hence, the need to employ a screw cap, flip-top lid, or other separate closure is eliminated because, after use, the dispenser automatically closes.

The term "panel" should not be construed to necessarily indicate a generally rectangular or discrete panel shape. In this regard, and as described below, the panels may have differing shapes. Also, each panel may extend into the resilient material wall from a body of elastomeric material located at the dispenser outlet and so in such embodiments would not be considered discrete.

The term "fluid" is intended to include liquids, viscous liquids and flowable solids; pastes and creams etc.

The term "container" is intended to include tubes, bottles, jars, tubs, cylinders, vessels, flasks, chambers etc, whether pliable or rigid. Thus, in the case of a pliable container, a fall in fluid pressure may be caused by eg. releasing manually applied pressure to an external pliable wall of the container. In the case of a rigid container, a fall in fluid pressure may be caused by releasing pressure applied to fluid within the container by eg. a plunger, piston, pump etc.

In one application the dispenser is suitable for and employed with a container that has a single outlet, with the dispenser being mountable at that outlet such that any fluid leaving the container via the single outlet is directed into the inlet of the dispenser.

In one form the container and dispenser can be adapted for mounting to each other (eg. the dispenser can be purpose-built for the container, or vice versa, or both). For example, compatible materials can be employed that enable easy mounting (such as by heat welding, adhesive etc). Such materials may also have resistance to the substance stored in the container.

In one embodiment the outlet comprises an elongate mouth, with a section of elastomeric material surrounding and defining the mouth. The panels may extend from the section of elastomeric material and into the wall of resilient material for a discrete distance. A distal end of the or each elastomeric material panel can define a curved edge, the curved edge matching a curved recess in the wall of resilient material at the outlet. The curved edges can impart certain desirable functionality to the wall of resilient material, as described below.

Thus, the wall of resilient material, section of elastomeric material wall and panel(s) can combine to define a nozzle at the outlet, which facilitates direction and release of fluid in use of the dispenser. In addition, by providing an elongate mouth, control over the quantity or measure of fluid can be exercised. Furthermore, an elongate mouth construction can better facilitate mouth opening and closing of and by the surrounding wall and section. The or each elastomeric material panel and the elastomeric material section may also be formed contiguously with the adjacent resilient material to define a unitary wall construction at the outlet. In other words, the took, feel and operation of the wall may then be unitary.

When the outlet is elongate, up to six elastomeric material panels can be provided. Also the same number of panels can be located on one side of the outlet as are located on an opposite side of the outlet.

When two or more elastomeric material panels are located on each side of the outlet they can be sized such that the resilient wall material located between each panel defines a finger. For example, three elastomeric material panels located on each side of the outlet defines two respective fingers therebetween. The or each finger can extend down to the outlet such that a distal end of each finger is located close to the outlet. The or each finger can then flex outwardly to open the outlet at the predetermined pressure, and move inwardly and close the outlet at a pressure less than the predetermined pressure. By providing the resilient material in the form of one or more fingers, the resilient material is more likely to flex to open the mouth, than if the entire mouth was surrounded by a resilient material (for example, as shown in U.S. Pat. No. 1,977,227).

In an alternative arrangement, the fingers can be moulded in an already assumed open orientation. Then, the elastomeric material panels can be moulded to hold and maintain the fingers so as to close the outlet. In this way, the fingers can impart or promote a tendency of the dispenser to open at a predetermined pressure, which tendency is resisted by the elastomeric material panels. This alternative configuration can ensure a more prominent opening of the dispenser in use.

Each finger of the surrounding wall may flare outwardly, from where it is connected to a remainder of the surrounding wall, to a finger distal end. The interaction of the elastomeric panels with the flared finger end can then promote/allow a torsional/twist movement to the wider distal end of the finger as it flexes outwardly-in use. This in turn can expand the mouth cross-sectional area to provide for greater fluid release from the container and to define a more ovallic shape at the outlet.

The outlet can comprise a slit extending across a thin end of the dispenser. The slit can provide for effective fluid-tight closure at the outlet. The distal end of each finger may be defined as a generally straight edge whereby the straight edge of the fingers can then combine with adjacent elastomeric material to maintain the slit shape at the outlet. Where the fingers are flared, the length of finger edge adjacent to the slit-shaped outlet can be maximised, increasing the tendency of the slit-shaped outlet to close.

Each finger of the surrounding wall may optionally comprise a reinforcing rib extending along an inside surface thereof which is adapted to cause the finger to further bias closed the outlet, with the rib also flexing at the predetermined pressure. The provision of a rib at each finger helps preserve the integrity and capability of the finger to return to the closed position once the predetermined pressure is released (eg. to provide a cyclical function to the dispenser for the life of its use with the associated container).

The or each rib may each be shaped to promote or allow rotation of the finger through a horizontal axis thereof. This rotation can allow each finger to move laterally away from each other finger during opening, in addition to a flexing away from opposing finger(s) at the outlet. In this regard, each rib may have a shape that is transversely wider at its junction with the finger than at a distal rib base to thereby form a V-shape in cross-section. Also, each rib may be wider towards the distal end of each finger, with opposing walls of the rib converging moving from the finger distal end towards the dispenser inlet.

When the outlet is elongate, elastomeric material panels can additionally or alternatively be defined to extend from opposite ends of the outlet for a discrete distance into the surrounding wall (ie. to provide an additional or alternative flex aid to the surrounding wall of resilient material).

Both the elastomeric and resilient materials may comprise polymers, either with thermoplastic or thermoset properties. Elastomeric and resilient materials may each be selected that resist degradation from aromatic and other solvents present in the container fluid, and may comprise materials that also provide a barrier to gas or moisture migration into/from the container.

The elastomeric material can be a thermoplastic or thermoset elastomer-rubber or another relatively flexible/deformable elastomer, for example, thermoplastic polyurethane (TPU). The resilient material can be a thermoplastic or thermoset polymer selected to provide strength and resiliency, for example, a nylon (polyamide), a polyethylene, a polypropylene, a polyethylene terephthalate, a polybutylene terephthalate or another resilient (eg. relatively stiff or rigid) polymer.

The dispenser can be formed by co-moulding or bi-moulding the resilient material with the elastomeric material, both methods providing for cost efficient, rapid, reproducible and efficacious dispenser manufacture.

The container can also be formed of the same or a compatible material to the resilient material of the dispenser to better enable their mounting together (eg. by bonding, adhesion, welding etc).

In one embodiment the dispenser is defined by a single piece, two material co-moulded component. In this regard, the dispenser wall (body) can be formed from nylon, and the panel(s) can be formed from a thermoplastic polyurethane elastomer. Such a dispenser may also be mounted to a container that comprises nylon at one of its surfaces, for ease of dispenser attachment and sealing thereto and to provide an integrated unit comprising the dispenser and the container (which also allows a hermetic unit to be provided). A two-material dispenser option provides for manufacturing simplicity.

In another embodiment of the dispenser, an optional band of material (eg. of polyethylene) may be provided at the inlet to produce a three material co-moulded dispenser component. The optional band of material can allow for joining (eg. by welding) of the dispenser to containers that comprise materials that are not compatible with the dispenser wall (body) material. For example, where the dispenser wall is of nylon and the container comprises a material other than nylon (eg: polyethylene) the optional band of material may be eg. polyethylene. The optional band thus allows the dispenser body material to be maintained for different container materials. Other multiple material combinations are also possible.

The dispenser can taper downwardly from the inlet to outlet. This directs and favours fluid delivery to the outlet (eg. when the container is pressurised).

The dispenser can be adapted for mounting to an open end of a container in the form of a pliable or rigid tube or bottle. However, the dispenser may also be used with rigid piston or plunger or pump-actuated tubes and cylinders etc. In one application, the inlet of the dispenser is circular for affixing to an open circular end of a tube or bottle, with the opposite end of the tube or bottle being closed. The tube or bottle may also be generally circular in cross-section along its length or be closed by a sealed straight edge at its opposite end. Alternatively, the tube may have a generally square or other cross-sectional shape, with the dispenser inlet being shaped accordingly.

The dispenser inlet can be welded to the open end of the tube or bottle. Alternatively the dispenser inlet can be adhesively or screw-mounted to the tube or bottle, or it can be push, interference or snap-fitted to an open end of the tube or bottle. In some of these cases the dispenser may be removably mounted to the tube or bottle.

In one embodiment a strip of material is frangibly connected to the outlet to seal the same prior to use. The removal of the strip can then enable the outlet to open in use. This can provide a tamper evident function to the dispenser (ie. prior to consumption of the fluid in the container). Further, the strip can provide a gas tight and hermetic seal after the dispenser is mounted to a container. For example, in the case of a tube, this seal can result after mounting of the dispenser to one tube end and after closing of the opposite tube end after fluid filling the tube, thus proving an integrated unit with a complete hermetic seal.

When the outlet is elongate, typically the strip of material is a tear strip frangibly connected along the length of the outlet and detachable therefrom by a manual pulling action initiated at a protruding end of the strip, the removal of which exposes the outlet for use. In this regard, the protruding end of the strip can be defined as an enlarged head which is more readily engageable by the fingers of the user to facilitate strip removal.

The strip of material can, for example, be formed from the same elastomeric material as the or each panel, such that the strip is formed simultaneously with the elastomeric material panel(s). As a further variation, the strip formation may be such that when the strip is removed the outlet may still be closed (eg. by a remaining thin portion of material extending across the outlet). However, the outlet can be adapted to rupture at or as the predetermined pressure is approached.

In one mode of use, the dispenser receives fluid out of a tube or bottle open end when the tube or bottle is squeezed, pressed or pressured internally. The predetermined pressure applied to the fluid in the dispenser can be reached as a result of the tube or bottle being squeezed, pressed or pressured. The predetermined pressure is then released when the squeezing, pressing or pressuring of the tube or bottle is eased or ceases.

In this regard, the predetermined pressure can correspond with a manually applied squeezing, pressing or pressuring of the container by a user. For example, where the fluid is a viscous fluid such as toothpaste, the predetermined pressure can correspond with that pressure applied by a user when squeezing a tube (or bottle) between his/her fingers.

In this mode of use, the dispenser can be adapted for use and operation with viscous fluids such as toothpastes, creams, food pastes/sauces, detergents, resins, adhesives etc.

In a second aspect the present invention provides a dispenser for dispensing a fluid from a container, the dispenser comprising:
an inlet for mounting to the container so as to receive therethrough the fluid; and
an outlet formed from at least an elastomer and a polymer;
wherein the elastomer has greater flexibility and less resiliency than the polymer to enable outlet opening to release the fluid therefrom when a predetermined pressure is applied to the fluid in the dispenser, and the polymer has less flexibility and greater resiliency than the elastomer to enable outlet closing to retain fluid in the dispenser at a pressure less than the predetermined pressure.

In a third aspect there is provided a dispenser for dispensing a fluid from a container, the dispenser comprising:
an inlet for mounting to the container so as to receive therethrough the fluid; and
an outlet which is adapted to open to release fluid therefrom when a predetermined pressure is applied to the fluid in the dispenser at the outlet, and to close to retain fluid in the dispenser at a pressure less than the predetermined pressure;
wherein a wall at the outlet comprises one or more fingers of resilient material extending down to the outlet, the or each finger being able to flex at the predetermined pressure and thus enable the outlet to open.

In the third aspect, the or each finger may flare outwardly, from where it is connected to the wall, to a finger distal end. As stated above, this finger configuration can promote/allow a torsional/twist movement to the wider distal end of the finger as it flexes outwardly in use. This in turn can expand the mouth cross-sectional area to provide for greater fluid release from the container.

In a fourth aspect there is provided a dispenser for dispensing a fluid from a container, the dispenser comprising:
an inlet for mounting to the container so as to receive therethrough the fluid; and
an outlet which is adapted to open to release fluid therefrom when a predetermined pressure is applied to the fluid in the dispenser at the outlet, and to close to retain fluid in the dispenser at a pressure less than the predetermined pressure;
wherein a wall at the outlet comprises one or more ribs of resilient material extending into the wall from the outlet, the or each rib being able to flex at the predetermined pressure and thus enable the outlet to open, but with the or each rib tending to close the outlet in use.

In the fourth aspect each rib may be formed as part of a respective finger, as defined in the first and third aspects. Each rib may extend along an inside surface of its respective finger. The or each rib may also each be shaped to promote or allow rotation of the finger through a horizontal axis thereof. In this regard, each rib may have a shape that is transversely wider at its junction with the finger than at a distal rib base to thereby form a V-shape in cross-section. Also, each rib may be wider towards the distal end of each finger, with opposing walls of the rib converging moving from the finger distal end towards the dispenser inlet.

The dispenser of the second, third and fourth aspects may otherwise be as defined in the first aspect.

BRIEF DESCRIPTION OF THE DRAWINGS

Notwithstanding any other forms which may fall within the scope of the dispenser as defined in the Summary, specific embodiments of the dispenser will now be described, by way of example only, with reference to the accompanying drawings in which.

DETAILED DESCRIPTION OF SPECIFIC EMBODIMENTS

Figure 1:
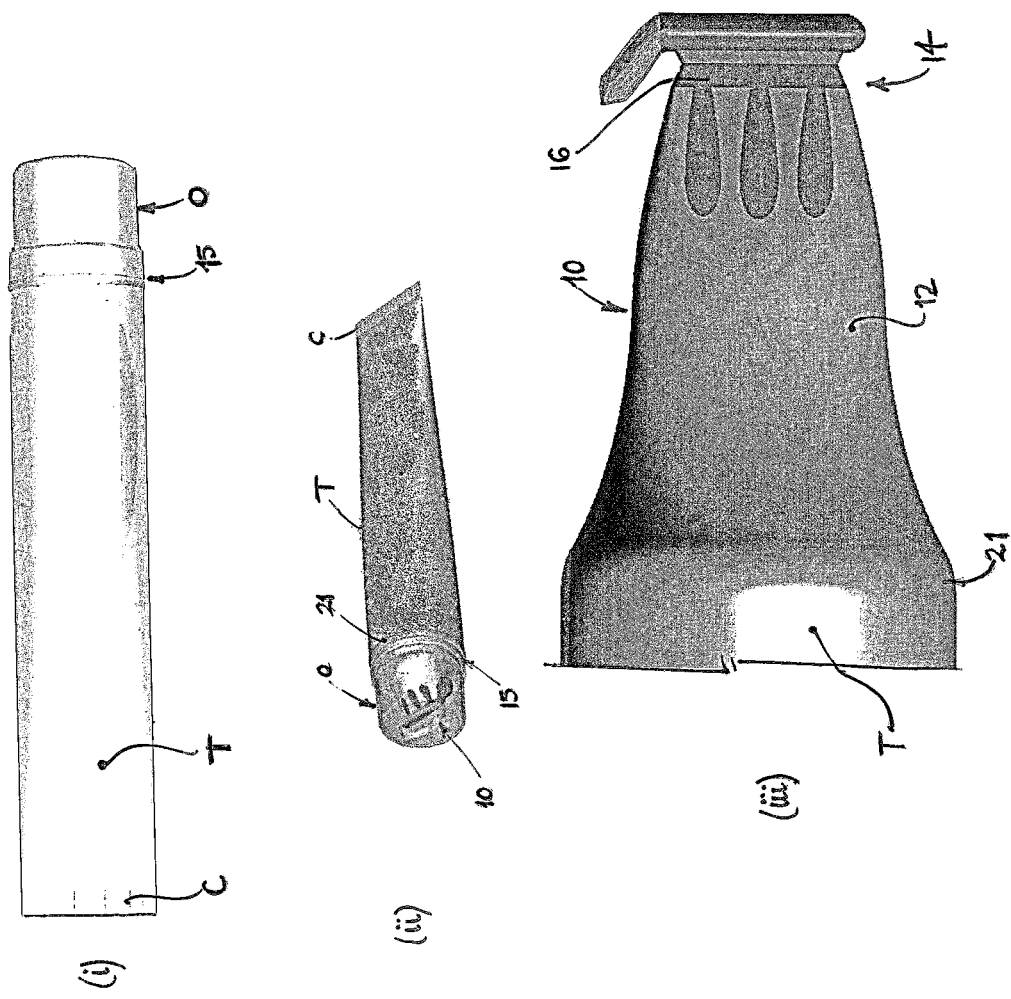
FIGS. 1(*i*) and (*ii*) respectively show plan and perspective elevations of two complete tubes with a first dispenser and dispenser overcap mounted thereto, with FIG. 1(*iii*) showing, in an enlarged plan elevation, an end region of a tube (eg. of FIGS. 1(*i*) and (*ii*)) illustrating the overcap removed.

Referring firstly to FIGS. 1(*i*) and (*ii*), a pliable/flexible tube T is shown with an overcap O mounted thereto. The overcap O covers and protects a dispenser in the form of a self closing valve component 10 mounted to the end of tube T (FIGS. 1(*ii*) and (*iii*)). The valve component 10 can be mounted to a variety of container types and shapes, but is consistently shown in the drawings as being mounted to a tube T. It should therefore be appreciated that the tube T is just one example of a container to which the component 10 can be mounted. In this regard, the tube T of the drawings may readily be substituted with a pliable/flexible bottle etc.

The tube need not have a circular cross-section, and may eg. be generally square, triangular etc in cross-section (eg. to provide flat surfaces for easier printing or labelling thereon). However; when circular in cross-section, the tube T has a circular open end for mounting to the body 12, and is closed C at its opposite end.

The tube typically houses a viscous fluid such as a cosmetic cream or paste (eg. toothpaste), a shampoo or conditioner, a medicament cream or paste, a soap or detergent, a food paste or sauce, an adhesive or glue, a filler or binding agent etc.

The overcap O is typically used during storage, transport and in-store, but may be re-used during use of the tube or discarded after initial removal. The overcap can provide tamper resistance and provide for tamper evidency. It may also provide a secondary sealing function (described below).

Referring now to FIG. 1(*iii*), a dispenser is shown in the form of self closing valve component 10 comprising a tapering body 12 and a self closing valve formation 14. The dispenser of FIG. 1(*iii*) exhibits a smooth transition where it is mounted to the tube T. However, a stepped arrangement 15 in the dispenser can be employed for secure mounting of the overcap (described below).

The self closing valve formation of FIG. 1 enables the tube T to be repeatedly used without the need for a separate closing action (such as from a screw cap or flip-top lid etc).

Figure 2:
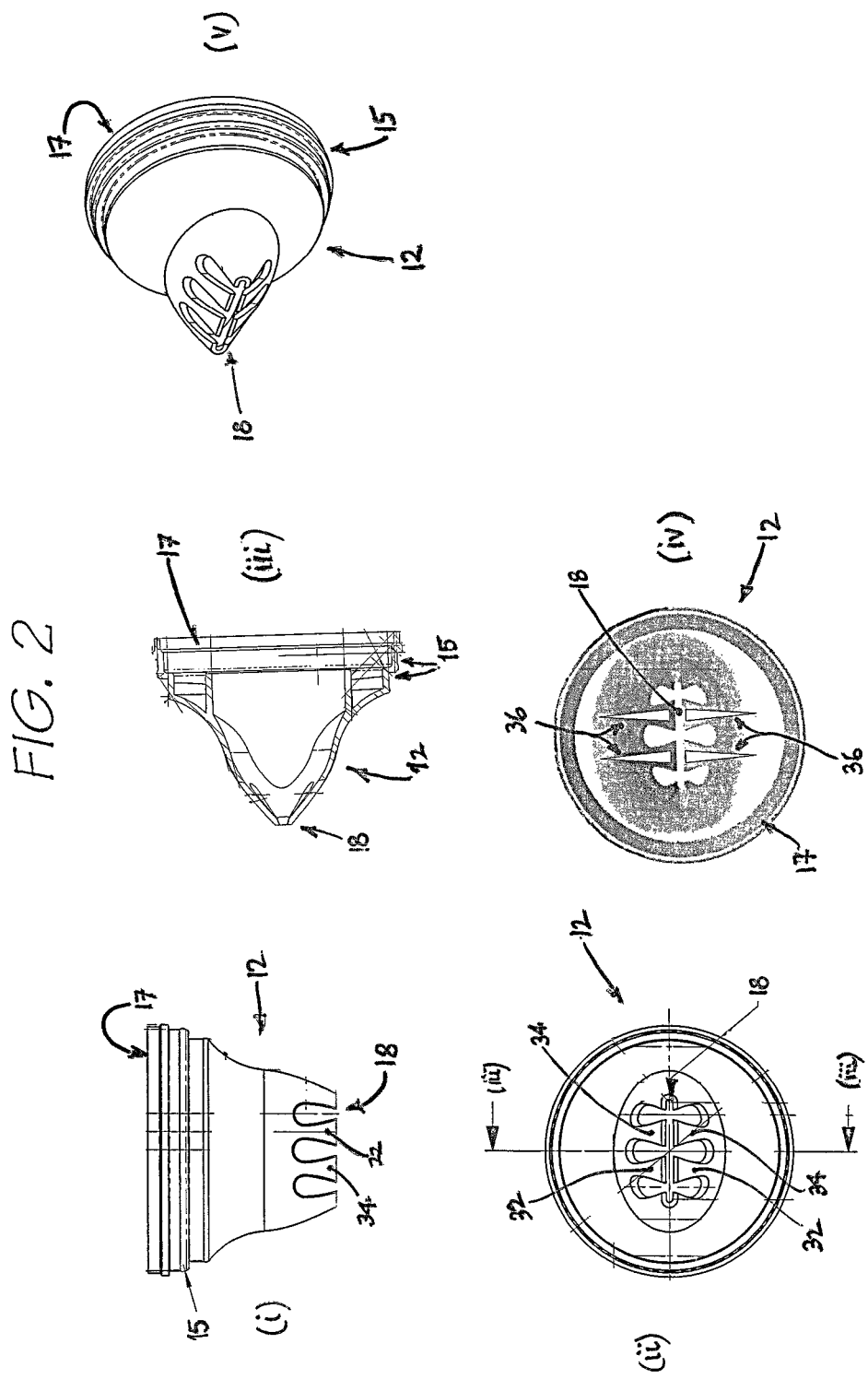
FIGS. 2(*i*), (*ii*), (*iii*), (*iv*) and (*v*) respectively show plan, end, side sectional, reverse end and perspective elevations of a body of the dispenser of FIGS. 1(*i*) and (*ii*)
Figure 3:
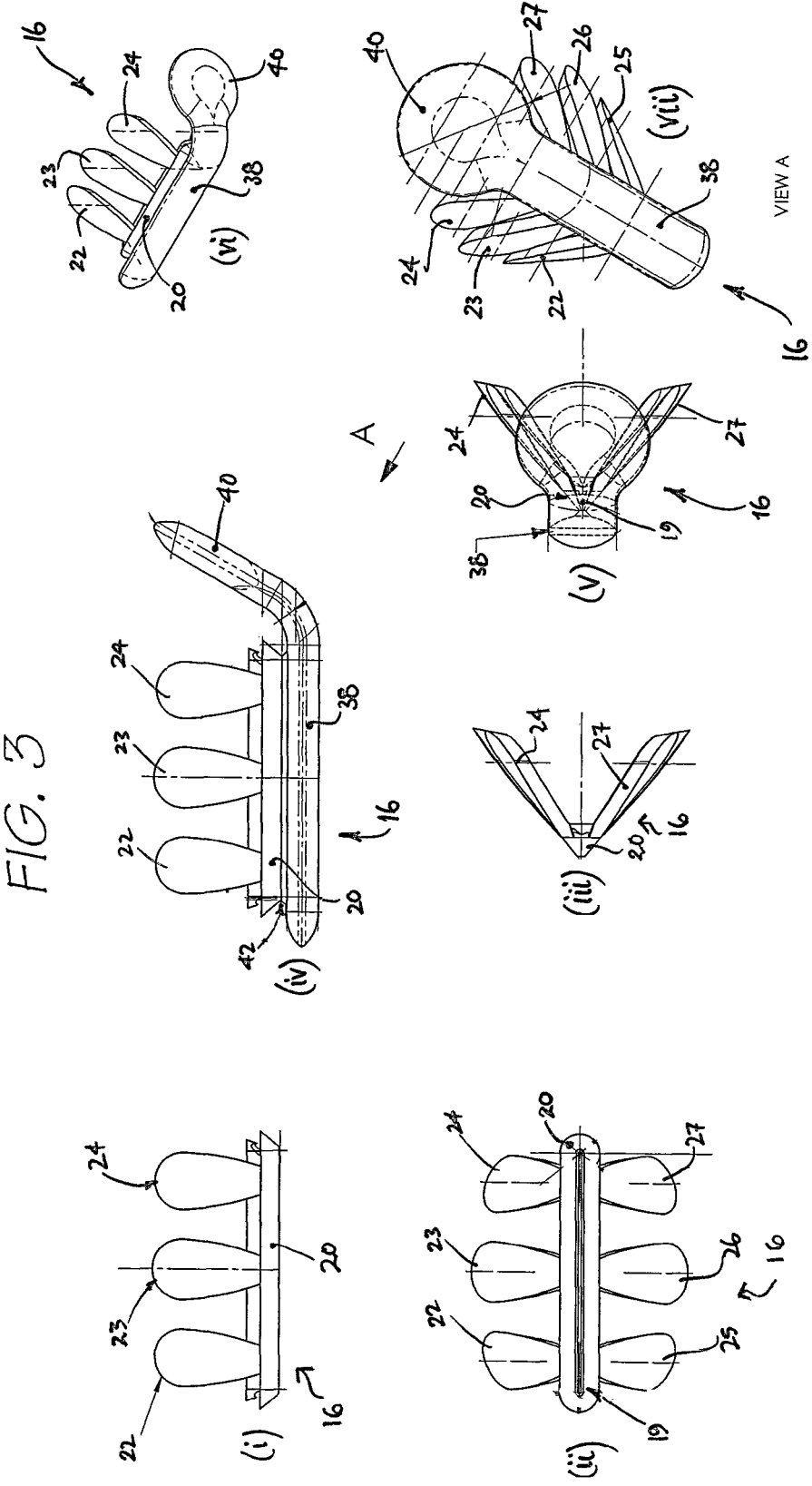
FIGS. 3(*i*), (*ii*), (*iii*) respectively show plan, end and side elevations of an outlet portion removed from the dispenser of FIGS. 1(*i*) and (*ii*) and with tear strip removed, with FIGS. 3(*iv*), (*v*), (*vi*) and (*vii*) respectively showing plan, side, perspective and alternate perspective elevations of the outlet portion with tear strip attached.
Figure 4:
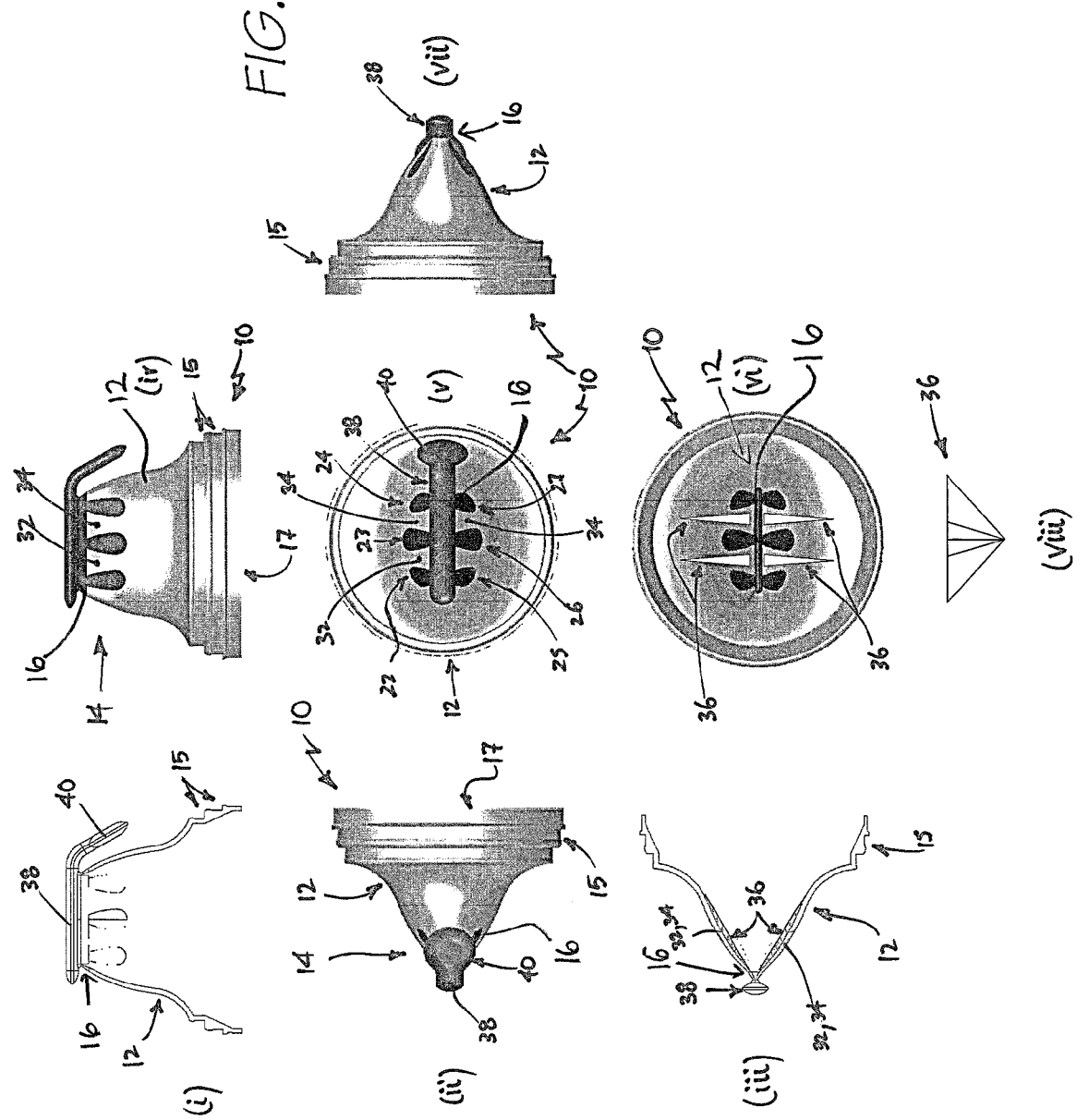
FIGS. 4(*i*), (*ii*), (*iii*), (*iv*), (*v*), (*vi*) and (*vii*) respectively show plan sectional, side, side sectional, plan, end, reverse end and reverse side elevations of an assembled dispenser of FIG. 1, with FIG. 4(*viii*) showing a detail of the dispenser of FIG. 4(*vi*)

Referring now to FIGS. 2 to 4, it can be seen that FIG. 2 shows the valve component body 12, FIG. 3 shows a mouth component 16 for the valve component 10 and FIG. 4 shows the body and mouth component assembled so as to define the valve component 10, including the valve formation 14, ready for mounting to a container.

In FIG. 2 it can be seen that the body 12 of valve component 10 is generally hollow. An inlet to the component 10 is defined by a circular opening 17 in body 12, adjacent to the steps 15 in the body outer wall. An outlet from the valve component is defined at a mouth 18 located at an opposite end of body 12 to opening 17. The circular opening 17 is adapted to be welded or otherwise fastened (eg. adhesively, screw mounted, push-fitted etc) to the tube T at 21 (see FIGS. 1(*ii*) and (*iii*)). Tube T accordingly has a circular open end for mounting around the body 12 at opening 17, with the body's external diameter at 17 being sized for a snug fit in the tube open end.

As shown in FIG. 3(*ii*), a mouth slit 19 is defined in an elastomeric band 20, with the band forming part of the valve formation 14 and being located in mouth 18 in the finished dispenser (FIG. 4). In this regard, the elastomeric material for band 20 is typically bi- or co-moulded with the body 12 (as described hereafter).

The body 12 tapers downwardly from opening 17 to mouth 18, with this taper continuing in mouth component 16 down to mouth slit 19 (see FIGS. 3(*iii*) & (*v*)). This construction helps guide and direct the flow of fluid towards the mouth slit 18 in use. The valve formation 14 thus includes the internal wall of body 12 adjacent to mouth 18, together with the internal wall of the mouth component 16.

FIGS. 1(*ii*) & (*iii*) and FIGS. 3 & 4 show three upper 22, 23, 24 and three lower 25, 26, 27 elastomeric panel portions extending from the band 19 and into the wall of body 12 adjacent to mouth 18. These panel portions are typically co- or bi-injection moulded together with the wall material of body 12 (ie. the panel and wall portions can be moulded in a single-step, or two or multi-step moulding process). The mould and moulding process is configured such that the body 12 and panel portions define a continuous/contiguous valve wall formation around and adjacent to the outlet of component 10, resulting in a unitary valve component construction (FIGS. 1(*ii*),(*iii*) and FIG. 4).

The body 12 is formed from a resilient material (eg. that is a relatively stiffer and a less flexible material than the panel portions). For example, the resilient material may comprise a thermoplastic or thermoset polymer including an amorphous or crystalline polyamide (nylon), polypropylene (PP), polyethylene terephthalate (PET), polybutylene terephthalate (PBT), and/or polyethylene polymer such as low density polyethylene (LDPE). In this regard, the body material can comprise one or a number of materials such as a nylon, PET or PBT base with an LDPE overlay, or other suitable combinations. The mouth component 16 and thus the elastomeric panel portions 22 to 27 can comprise a thermoplastic rubber (TPR), a thermoplastic elastomer (TPE), a thermoplastic polyurethane (TPU) or thermoset variations of these materials. The elastomeric panel portions are, in any case, relatively more flexible, deformable and less stiff or rigid then the surrounding body material.

Because these materials can be easily and readily co- or bi-moulded together, they allow a rapid manufacture of a unitary valve component 10. The resulting component also has a high degree of visual and tactile aesthetics and is easy to use.

Referring again to FIG. 2, the provision of the panel portions 22 to 27 results in two fingers 32, 34 of wall material being defined between the panel portions. Because of their discrete and elongate configuration, the fingers 32, 34 are more likely to flex outwardly when a pressure of fluid is exerted against their interior surface (ie. within the hollow interior of component 10).

Further, it can be seen that each finger flares outwardly, from where it is connected to the wall of body 12 adjacent to mouth 18, to a finger distal end. Because the wall of body 12 adjacent to mouth 18 is curved (see FIGS. 2(*ii*) & (*v*)), together with the finger configuration, a torsional/twist movement to the wider distal end of each finger can be imparted as it flexes outwardly in use. This in turn can expand the mouth cross-sectional area to provide for greater fluid release from the tube in use. For example, an almost cylindrical bead of material can exit the open mouth slit 19 of component 10 in use.

However, because of their lesser flexibility and greater resiliency, the fingers 32, 34 have a tendency to act against the band 20 to maintain the mouth slit 19 in the closed position. Also, because each finger is relatively wider at its distal end, a greater amount of resilient material is thereby defined adjacent to the band 20, thus tending to maintain a seal at the mouth slit 19 with repeated use of the valve component.

On the other hand, the panel portions, because of their greater flexibility and elastomeric properties, have a tendency to facilitate mouth opening when a pressure of fluid is applied at the interior surface of each panel portion. The panel portions also allow the fingers 32, 34 to flex and help control that flexing, and yet maintain the integrity of the valve formation and also maintain a seal when the valve formation is in its closed position (ie. mouth slit 19 closed).

In an alternative configuration, the fingers 34 can be moulded in an already assumed open orientation. Then, when the mouth component 16 is moulded around the fingers, they can then be biased into and held in the closed position by the elastomeric material of the component 16. In this way, the fingers can impart or promote a tendency of the valve component 10 to open at a predetermined pressure, which tendency is resisted by the elastomeric material of the component 16. This alternative configuration can ensure a more prominent opening of the valve component 10 in use.

As shown in FIGS. 2 and 4, each of the fingers 32, 34 can be provided with an integral reinforcing rib 36 extending inwardly of the body 12 from the interior surface of each finger 32, 34. The ribs 36 enhance shape memory over the term of use of the valve formation and further promote return of the valve formation to its closed orientation.

As best shown in FIG. 4(*iii*), each rib 36 increases the overall thickness of the finger 32, thus acting as a stiffening element and acting to reinforce the shape integrity of the finger during repeated use (ie. repeated outward flexings). Also, as best shown in FIGS. 2(*vi*), 4(*vi*) and (*viii*), each rib 36 is shaped to promote or allow rotation of the finger through a horizontal axis thereof (ie. to thus facilitate the finger torsional/twist movement as it flexes outwardly in use). In this regard, each rib has a shape that is transversely wider at its junction with the finger than at a distal rib base to thereby form a V-shape in cross-section (see FIG. 4(*viii*)). Also, each rib is wider towards the distal end of each finger, with opposing walls of the rib converging moving from the finger distal end towards the inlet 17 (see FIGS. 2(*vi*), 4(*vi*)). This construction provides a rotating capability to the rib and hence to the finger, allowing the fingers to flex laterally away from each other during opening for improved mouth definition.

A tamper evident sealing strip 38 is typically frangibly attached to (eg. by being integrally moulded with) the band 20. The strip is moulded such that, after moulding, the strip 38 covers and closes the mouth slit 19 and provides a seal thereto (typically a hermetic seal). Usually the strip is an integrally moulded part of the mouth component 16.

The strip 38 is provided with an enlarged strip head 40 for easy finger grasping by a user. The head 40 is also swept back for compactness of the valve component 10 prior to use. The join 42 of the strip 38 to the band 20 is typically defined as a narrow, frangible elongate neck to facilitate removal of the strip by a user (see especially FIG. 4(*iii*)). In this regard, typically a user grasps the strip head 40 between their fingers and tears the strip away from the valve component 10, the strip detaching along join 42. Such tearing action may or may not expose and open the mouth slit 19, and if not then typically only a very narrow membrane of material remains at the mouth slit 19 which can sever as soon as fluid under pressure is forced into the mouth slit.

The employment of a sealing strip means that the resulting valve component and tube arrangement does not then require separate packaging (eg. in a box). The tube may accordingly be formed in a square or rectangular shape in cross-section which allows for handling, storage and labelling benefits traditionally requiring the use of additional packaging (eg. a square or rectangular cross-sectionally shaped box). The strip also provides an additional level of tamper evidency and tamper resistance. Further protection can then be provided by the overcap O, such that two levels of tamper evidency and resistance are provided, as well as two levels of hermetic sealing, again obviating the need for a box.

In use of the arrangement of FIG. 1, a user removes the overcap O, then the sealing strip 38 as described above and then squeezes tube T in a known manner (eg. between one or more fingers and a thumb). This forces fluid (eg. viscous liquid or paste) out of the tube and into the hollow interior of the valve component 10. The fluid is directed by the tapering body 12 into the mouth component 16 to reach the mouth slit 19. At a given pressure (eg. at a predetermined pressure determined by the manufacturer) the fluid causes the fingers 32, 34 to be flexed and twisted outwardly, as facilitated by a flexing and stretching/expansion of the elastomeric panel portions, so that a controlled/controllable amount of fluid is dispensed from the mouth slit 19. The panels typically also have a shape memory function such that they tend to flex and retract back inwardly when the pressure is released and, together with the resiliency of the fingers 32, 34 and ribs 36, restore the valve formation 14 to its pre-pressurised (mouth slit closed) configuration.

Thus, once valve component 10 has been opened, it has an in-built self-closing valve characteristic such that, providing the fluid pressure in the valve component does not reach the given pressure (predetermined pressure) the valve formation will continue to seal the fluid within the component and tube, thus preventing inadvertent fluid discharge/release. Hence, there is no need to provide the arrangement with a cap, lid or other separate closure feature, as a self-closing valve function is in-built into the component 10. This results in a much cleaner and more hygienic arrangement, and especially when the arrangement is used by infant users or the like.

Figure 5:
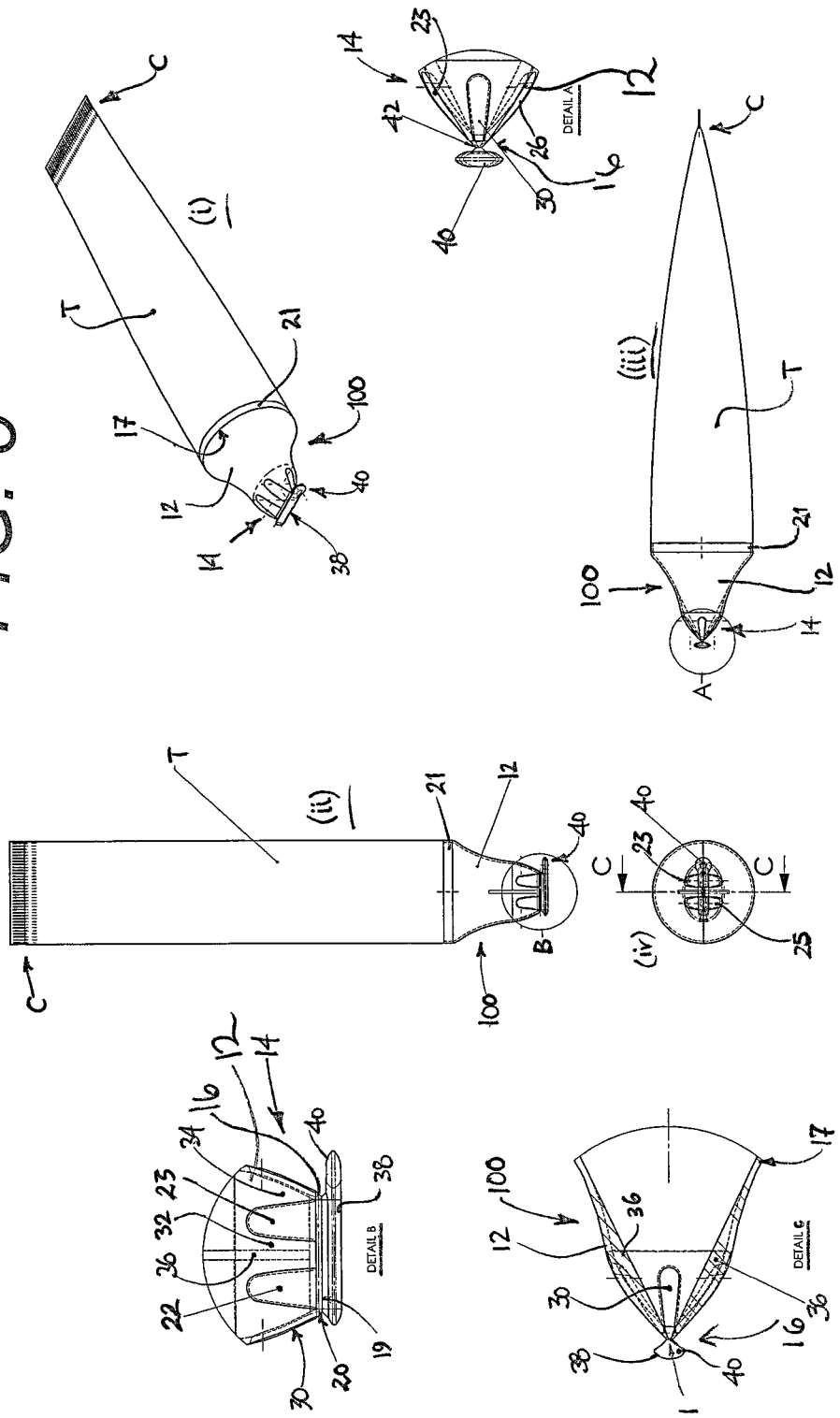
FIGS. 5(*i*), (*ii*), (*iii*) and (*iv*) respectively show perspective, plan, side and end elevations of a tube with a second dispenser mounted thereto, with FIGS. 5A, B and C respectively showing a detail of the dispenser of FIG. 5(*iii*), a detail of the dispenser of FIG. 5(*ii*) and a cross-sectional view of the dispenser of FIG. 5(*iv*) taken on the line C-C.
Figure 6:
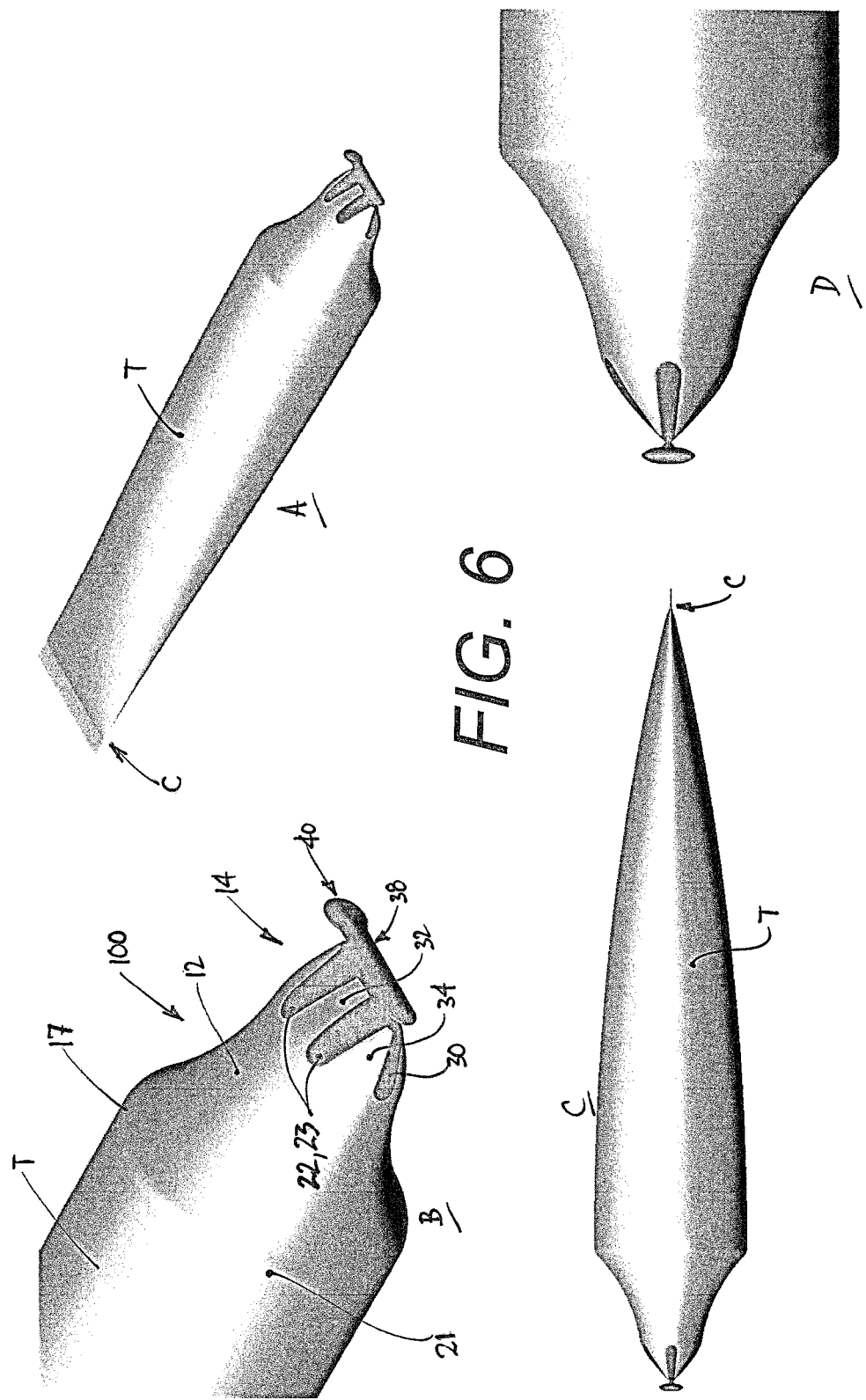
FIGS. 6A-6D respectively show, in rendered format, a perspective view, a perspective detail, a side view and a side detail of the tube and dispenser configuration of FIG. 4.

Referring now to FIGS. 5 and 6, where like reference numerals are used to denote similar or like parts, an alternative dispenser is shown in the form of self closing valve component 100. The function of the valve component 100 and its valve formation 14 is essentially the same as that of FIGS. 1 to 4 although some differences in construction will now be explained.

As best shown in FIGS. 1(*iv*), 1B and 1C the valve formation 14 comprises two upper and two lower elastomeric panel portions 22, 23 and 25, 26 (and not three as per the dispenser of FIGS. 1 to 4). In addition, valve formation 14 comprises two opposing elastomeric side panel portions 30 extending from opposite ends of band 20. Again, as best shown in FIG. 6, the body 12 and panel portions 22-30 define a continuous/contiguous valve wall formation around the mouth slit 19, resulting in a unitary valve component 10.

FIG. 5B shows how the panel portions 22-30 define a number of fingers 32, 34 of wall material therebetween which function in a similar manner to the fingers of FIGS. 1 to 4. However, in this embodiment the fingers are, in effect, defined right around the valve formation 14.

To enhance shape memory and return of the valve formation to its closed orientation, at least the central finger 32 on each side of the mouth slit 19 can be provided with an integral reinforcing rib 36 extending inwardly of the component from the interior surface of each finger 32. As with FIGS. 1 to 4, the ribs 36 increase the overall thickness of the finger 32, act as a stiffening element and reinforce the shape integrity of the finger during repeated outward flexings.

In this embodiment the strip head 40 of tamper evident sealing strip 38 projects straight out from the strip and is not swept back as with FIGS. 1 to 4.

The use of the arrangement of FIG. 5 and 6 is similar to FIGS. 1 to 4 in that a self-closing valve function is in-built into the component 100 to prevent the inadvertent discharge of fluid, and provide a much cleaner and more hygienic arrangement.

Figure 7:
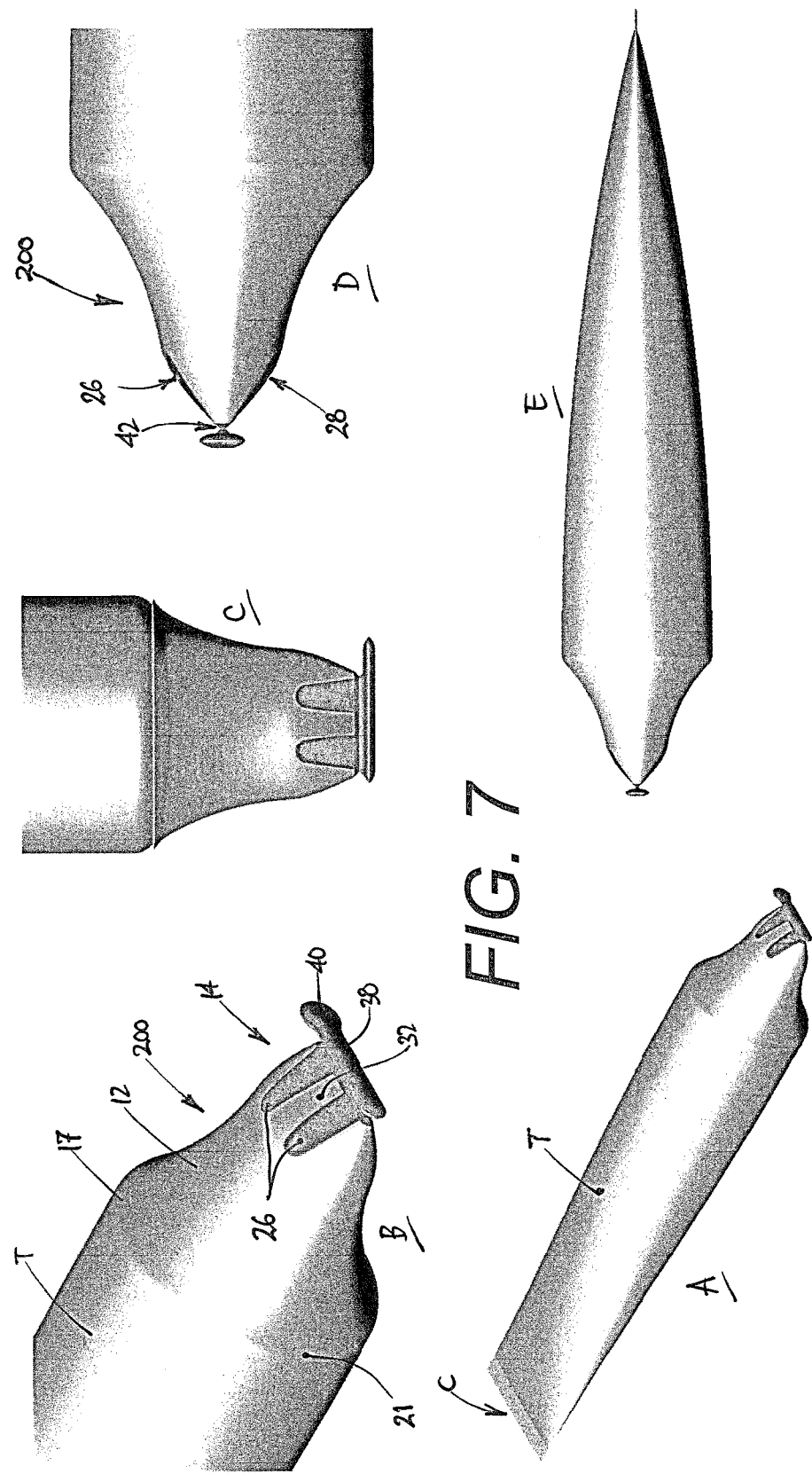
FIGS. 7A-7E respectively show, in rendered format, perspective, perspective detail, plan detail, side detail and side elevations of a third dispenser configuration.

Referring now to FIG. 7, where like reference numerals are used to denote similar or like parts, a self-closing valve component 200 in this embodiment comprises only two upper 26 and two lower 28 elastomeric panel portions. The elastomeric side panel portions 30 are omitted and hence lateral "fingers" 34 are not provided.

This embodiment is less complex and hence easier to mould than the embodiments of FIGS. 1 to 6, and requires a less complex moulding tool. Otherwise, its principles of use and operation are as described above for the embodiments of FIGS. 1 to 6.

Figure 8:
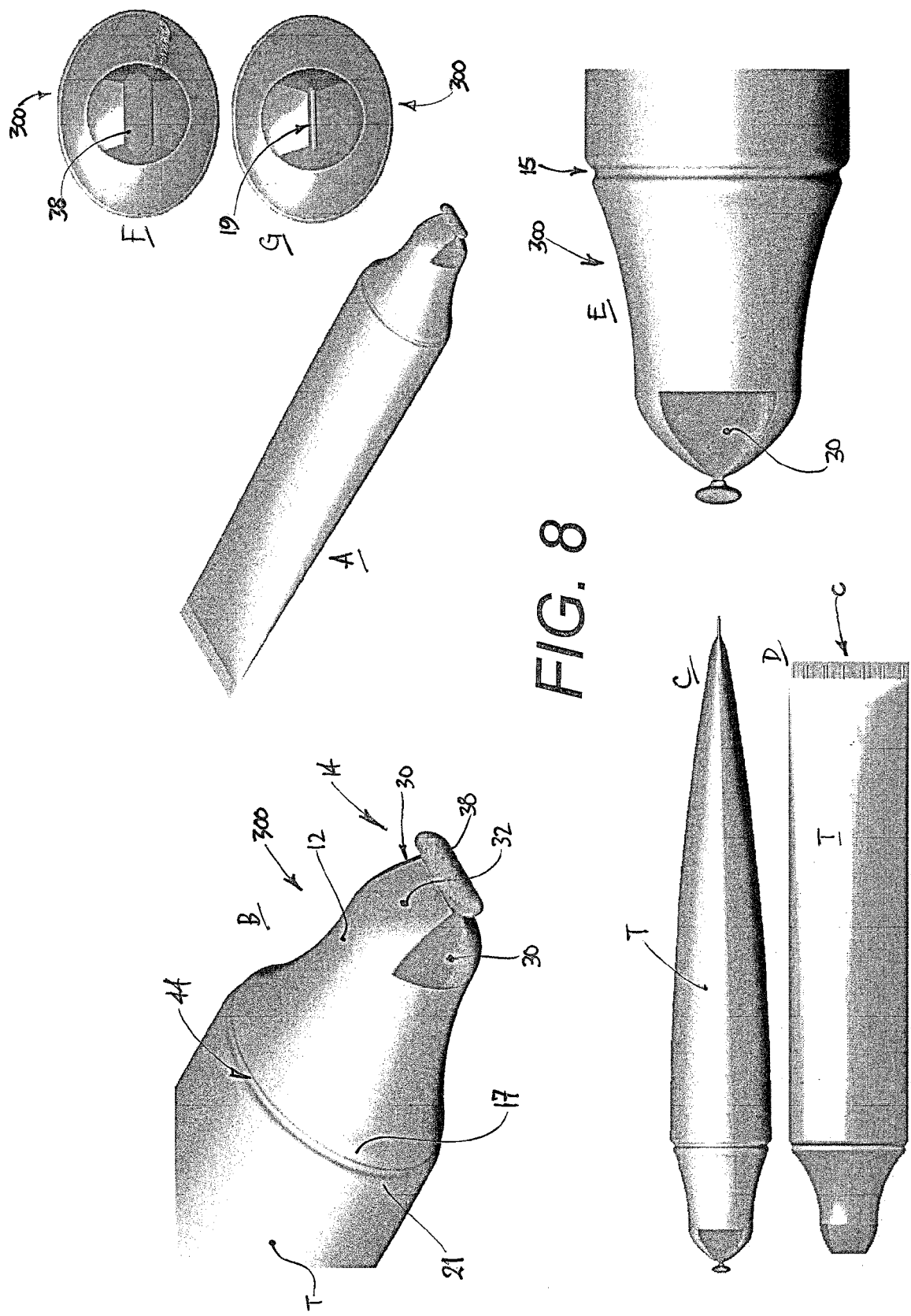
FIGS. 8A-8G respectively show, in rendered format, perspective, perspective detail, side, plan, side detail, end (strip attached) and end (strip removed) elevations of a fourth dispenser configuration.

Referring now to FIG. 8, where like reference numerals are used to denote similar or like parts, a further alternative self-closing valve component 300 is depicted. In this embodiment the elastomeric upper and lower panel portions are omitted, and the elastomeric side panel portions 30 are each expanded to have the dimension as shown in the drawings. Thus, a single large and wide finger 32 of wall material is defined, and this whole finger flexes outwardly as a result of a given pressure of fluid engaging its interior surface. This arrangement would thus tend to impart more of a ribbon shape to fluid exiting the valve component 300.

It should also be noted that the sealing strip 38 in FIG. 8 is not provided with an enlarged head 40, it nevertheless being sized for easy grasping and removal by a user. In addition, it will be seen that, adjacent to the seam-weld 21, a single circumferential step 15 is defined in the body 12 for receiving an appropriately shaped internally protruding ridge from an overcap for the valve component 300 (with examples of such overcaps being shown in greater detail in FIGS. 9 and 10).

FIG. 8G also shows an end view of the valve component 300 where the sealing strip 38 has been removed, clearly depicting the mouth slit 19.

Figure 9:
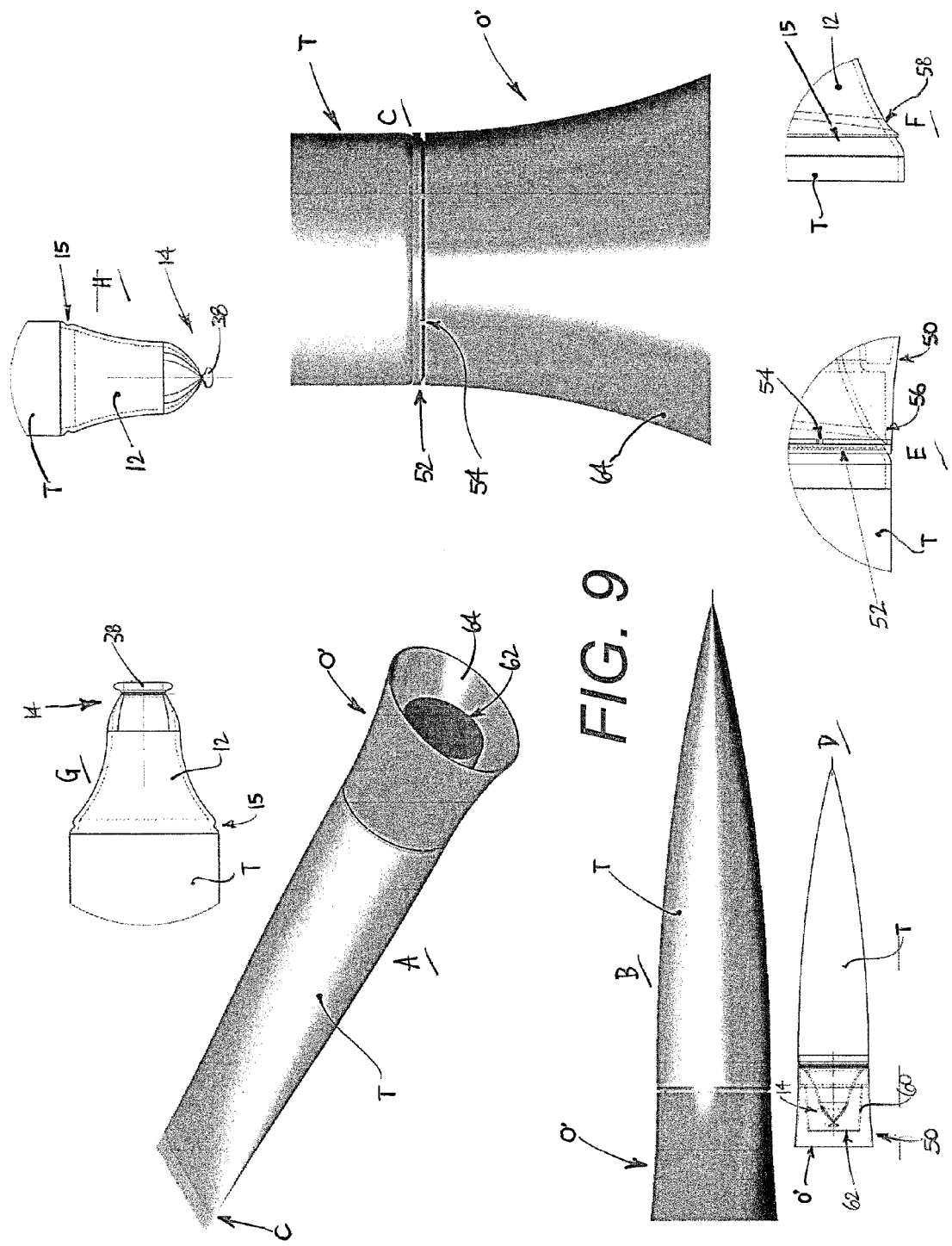
FIGS. 9A-9H respectively show (FIGS. 9A-9C in rendered format and FIGS. 9D-9H in outline format) perspective, side, plan detail, side outline, side detail (cap attached), side detail (cap removed), plan outline detail and side outline detail of the fourth dispenser configuration with a dispenser overcap.

Referring now to FIG. 9, where like reference numerals are used to denote similar or like parts, an outwardly flared tamper evident overcap O' can be mounted to the valve component/tube arrangement as best shown in FIGS. 9A to 9E. In this regard, the overcap can be adapted for interlocking with the circumferential step(s) 15 as described hereafter.

Overcap O' comprises a tamper evident circumferential band 52 which is frangibly connected thereto via a plurality of discrete connecting webs 54, each of which is frangible or can be ruptured when a sufficient pull or rotational (twist) force is applied to the overcap relative to the valve component/tube arrangement. In this regard, typically the overcap is push fitted onto the body 12 until the band 52 deforms and rides into stepped recess 15 in a kind of snap-fit. Once the overcap is pulled or rotated so as to sever connecting webs 54 a user can then readily detect that the overcap has been tampered with.

The overcap can be reattached to the body 12 in a push or interference type fit arrangement whereby an inner wall 56 thereof (see FIG. 9E) interferes with an appropriately sized and shaped portion 58 of the body 12. To further facilitate reattachment, the portion 5 8 can be provided with a second circumferential recess or groove and the inner wall 56 can be provided with a second inwardly protruding ridge or tip which snap-locks into the recess or groove.

It will be seen that the overcap O' has an internal chamber 60 defined therein by a protruding enclosure 62, the chamber being sized and adapted for accommodating valve formation 14 (as best shown in FIG. 9D). Also, when the inwardly protruding ridge or tip of inner wall 56 snap-locks into the recess or groove 15, an inside face of the chamber enclosure 62 may abut or lie in close facing arrangement to the mouth slit 19, to provide a secondary sealing function thereto.

The overcap O' of FIG. 9 is provided with an outwardly flared outer wall 64 to provide both an aesthetic effect to the cap and also a construction which improves the capacity of the combination tube-overcap to stand upright on eg. a flat surface.

Figure 10:
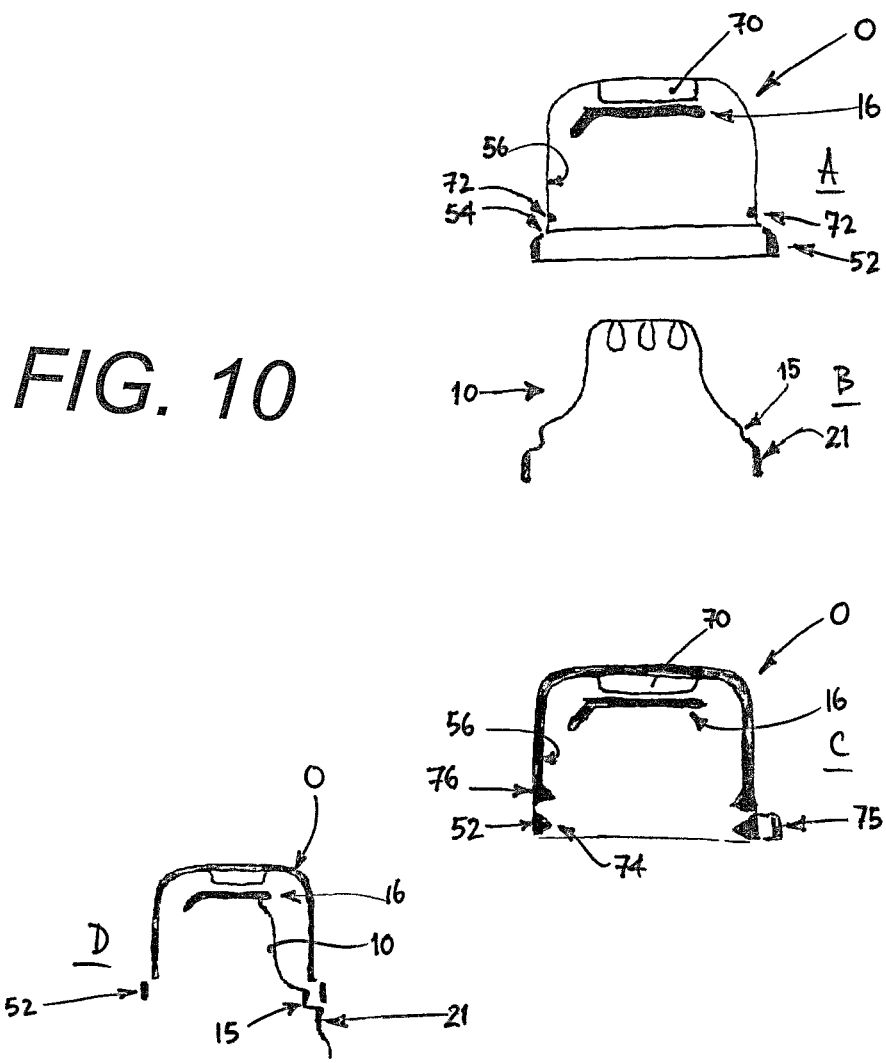
FIGS. 10A, 10C and 10D respectively show side sectional elevations of three alternative dispenser overcap configurations, with FIGS. 10B and 10D schematically illustrating in side elevation a dispenser and tube end to which the overcap of FIGS. 10A and 10D may respectively be attached.

Referring now to FIG. 10, where like reference numerals are used to denote similar or like parts, three different tamper evident overcaps O are schematically depicted in FIGS. 10A, 10C and 10D respectively. FIG. 10B schematically illustrates, in side elevation, the valve component 10 to which the overcap of FIG. 10A may be attached and FIG. 10D schematically illustrates, in side elevation, the valve component 10 to which the overcap of FIG. 10D may be attached. FIGS. 10A and 10D also schematically depict the location of the mouth component 16, in particular the tear band 38, when the overcap is mounted to valve component 10.

Each overcap O is provided with an internal recess 70 defined therein, the recess being sized and adapted such that the valve component can be accommodated within the overcap. However, the recess may also provide a secondary sealing function.

In this regard, in FIG. 10A, when the overcap is first attached to the component 10 the tamper band 52 initially sits adjacent to and interferes with region 21. When the overcap is removed (eg. by twisting), the webs 54 sever to separate the overcap from tamper band 52. The band 52 may then drop down on the component 10 (or be removed altogether). The tear band 38 is then removed so the arrangement is ready for use. When or if the overcap is reattached to the component 10, inwardly protruding bumps 72 in the overcap can snap-lock into the stepped recess or groove 15. This can correspond to an advanced position of the overcap. At this advanced position an inside face of the recess 70 can now abut or lie in a close facing arrangement to the mouth slit 19, to provide a secondary sealing function thereto.

Again, in FIG. 10C the overcap is first attached to the component 10. However, in this embodiment inwardly protruding ridges 74 on the tamper band 52 can snap-lock into the stepped recess or groove 15. The band 52 can be removed by gripping a band protruding end 75 such that the webs 54 sever to separate the band 52 from the overcap. This now frees the overcap for removal. Again, the tear band 38 is then removed so the arrangement is ready for use. When or if the overcap is reattached to the component 10, inwardly protruding ridges 76 in the overcap can now be snap-locked into the stepped recess or groove 15, corresponding to an advanced position of the overcap. In this position an inside face of the recess 70 can now abut or lie in a close facing arrangement to the mouth slit 19, to provide the secondary sealing function thereto.

The arrangement of FIG. 10D is similar to FIG. 10A except that, instead of bumps 72, an inside diameter of the overcap end with band 52 removed is sized to interferingly engage with the stepped groove 15, corresponding to an advanced position of the overcap. In this position an inside face of the recess 70 can now abut or lie in a close facing arrangement to the mouth slit 19, to provide the secondary sealing function.

EXAMPLES

In an embodiment where the fluid comprised a toothpaste, the body of the valve component was moulded in amorphous nylon (polyamide) and the mouth component was moulded using TPU, in a 2-material co- or bi-moulding option. This embodiment was then attached to a tube constructed with nylon as its inner layer, with the nylon body being easily welded to the tube inner layer, and the nylon also providing excellent resistance to aromatic solvents in the toothpaste. The grade of amorphous nylon employed also had the lowest flavour "scalping" function of all known polymers and was accordingly approved for use with toothpaste. The nylon was also a good barrier to oxygen and thus was observed to extend the life span of the tube contents, the valve component and, at the same time, also prevented fluid drying at or around-the outlet.

Integrating the inlet (shoulder) of the valve component with the tube also took advantage of the hermetic tamper evident seal/tear strip. The inclusion of an extended pad on the strip provided for ease of grip and the angled/swept backward configuration was observed to conserve space inside the overcap.

In a further embodiment, an LDPE band was moulded around the skirt of the valve component body to allow for welding of the body to a known tube. Known tubes were observed to have a thin PE inner layer used for welding to an HDPE shoulder of a conventional nozzle. It was noted that for toothpaste storage it was preferable to avoid a PE layer due to flavour scalping from the toothpaste aromatic solvents, however, a thin layer of PE was observed to be acceptable. In this case, the paste was observed to separate on the outside by forming a "skin" that insulated the main body of paste from scalping. The use of compatibilisers added to the nylon to co-mould with the LDPE was also investigated.

The overcap was tested and was observed to provide stand-up convenience. It also allowed removal of tube outer packaging and provided a reseal function to the valve component mouth slit, which again prevented accidental fluid discharge. The steps on the valve component shoulder readily accommodated the tamper evident band of the overcap. Modification of the steps could was also investigated to ensure a smooth radius at the shoulder to allow efficient tube manufacture (the steps for the overcap were able to be reduced in diameter to provide for this). Additional tamper evidency was thus provided by the overcap, providing an additional level of consumer protection.

Assuming an outside carton/box would no longer be required for tube packaging, the use of a "square tube" (square in cross-section) was investigated, for improved logistics and removal of external packaging. The use of a square tube was also observed to assist with printing/labelling.

The design and shaping of the fingers and elastomeric panels in the embodiment of FIGS. 1 to 4 was observed to improve the function of the valve component. By providing more rigid material across the length of the slit this embodiment was observed to encourage a good closing action, and the scalloping of the finger sides was observed to encourage the fingers to twist as they flexed.

The particular design of the ribs in fingers (wider at tip and narrow moving back towards the inlet to form a V-section) allowed the finger to rotate tortionally/laterally while it was flexing outwardly away from the mouth.

Tube Manufacture

With the use of nylon tubes the tube manufacture was via an extrusion system, as nylon could not be manufactured using a flat laminate web technique in which the tube was formed up over a mandrel and then seam welded.

Now that a number of embodiments of the dispenser in the form of a valve component have been described in some detail it will be apparent that the dispenser provides at least the following:

1. The dispenser provides for self closure and thus a separate screw cap or flip-top lid etc is not required. In normal modes of use, the dispenser is automatically closed and only opens when pressure is applied to fluid on the inside of the dispenser by squeezing, pressing or internally pressuring the container;
2. The dispenser is typically formed from two or three materials of different flexibility and or resilience and hence differential flex and resiliency characteristics can be imparted to achieve automatic valve opening and closing at predetermined fluid pressures within the dispenser;
3. The dispenser configuration lends itself to easy and ready co- or bi-moulding, allowing for rapid manufacture of a unitary component;
4. Such moulding and the configuration of the dispenser also enables a tamper evident sealing strip or band to be applied at the outlet of the dispenser, so that a user can detect whether or not the contents of the container/dispenser have been tampered with in any way;
5. An additional tamper evident feature can be applied to the overcap attached around the dispenser, and that overcap can also be provided with a self-standing function;
6. The sealing strip applied to the dispenser can provide a hermetic seal to the dispenser/container combination whereby separate packaging is not required, hence reducing packaging costs;
7. The dispensing rate of the fluid from the arrangement can be more readily controlled and regulated as a result of the self-closing valve function at the dispenser outlet;
8. This dispensing rate can be enhanced by those finger configurations which promote a torsional/lateral movement to the fingers during flexing, enabling a wide (eg. circular) outlet mouth to be defined;
9. Elongate, longitudinal ribs at the outlet can promote the self-closing action, and rib shaping can also contribute to finger torsional/lateral movement:
10. The aesthetics of the arrangement are enhanced, including the look and feel of the resulting arrangement;
11. Consumer convenience and confidence is enhanced, as a result of improved tamper evidency/resistance, packaging presentation and ease of use;
12. The mess of inadvertent fluid release and/or inadvertent sealing of a separate fastener are avoided;
11. Fluid within the dispenser is sealed against exposure to the surrounding atmosphere (especially where the fluid is air/oxygen sensitive);
12. The problems associated with usage by child users such as failure to close tubes, or inability to close tubes as a result of fluid build up, especially with flip top caps, are overcome;

13. The use of a resilient wall material provides an in-built spring function to the dispenser, whilst the use of elastomeric panel portions provides flexibility to the dispenser;
14. The various dispenser constructions adopted ensure outlet closure after repeated use; and
15. The dispenser when attached to the container provides an integrated unit that is tamper evident/resistant, hermetically sealed and complete for consumer release.

It will be appreciated that the dispenser described herein is susceptible to variations and modifications other than those specifically described. For example, the elastomeric panel portions can be positioned in regions other than those depicted, and other configurations of fingers, ribs etc can be adopted which enhance the spring opening and closing characteristics of the dispenser.

Whilst a dispenser formation for a pliable tube-like container has been shown and described, other container types can employ such dispensers. Such containers can include bottles, jars, tubs, cylinders, vessels, flasks, canisters, receptacles, chambers etc, whether pliable or rigid.

Containers can be employed where pressure is applied to the fluid by a sliding piston or plunger (eg. where the container has a rigid construction). Alternatively, the dispenser can be employed with pressurised containers where the fluid is ejected under pressure (eg. after a cap or sealing strip covering the valve formation is removed) or by action of a separate push-button.

The dispenser can also be removably attached to the container. For example, where the fluid is a curable substance, a first dispenser can be removed should the substance harden/cure therein and be replaced with a second new dispenser.

In addition, a body of the dispenser that tapers downwardly from the inlet to the outlet need not necessarily be employed. For example, the body may have a constant diameter or width from the inlet to the outlet, with the valve formation then being defined at the end of the body.

The dispenser can also be adapted for dispensing less viscous fluids such as liquids, and can be used for dispensing edible fluids, eg. liquids such as sauces, honey, condiments etc. In such latter cases, the dispenser can be employed with a so-called "squeeze bottle" container for the liquid.

All such constructions and applications remain within the scope of the dispenser defined and described herein, and it should be appreciated that the dispenser can be embodied in many other forms.

The invention claimed is:

1. A dispenser for dispensing a fluid from a container, the dispenser comprising:
   an inlet for mounting to the container so as to receive therethrough the fluid; and
   an outlet which is configured to open to release fluid therefrom when a predetermined pressure is applied to the fluid in the dispenser at the outlet, and biased closed to retain fluid in the dispenser at a pressure less than the predetermined pressure;
   wherein a wall of a stiff resilient first material is provided at the outlet with one or more deformable elastomeric panels within the first material wall, adjacent to and contiguous with the first material,
   wherein the one or more panels are of a deformable elastomeric second material that is a different material-type from the stiff resilient first material,
   wherein the one or more deformable elastomeric panels being formed contiguously with the adjacent stiff resilient material defines a unitary wall surface construction comprising both the stiff resilient first material and the one or more deformable elastomeric panels second material at an outer surface of the outlet when biased closed,
   such that, when the predetermined pressure is applied to the fluid in the dispenser, the one or more panels deform to enable the adjacent stiff resilient material to flex and thus enable the outlet to open.

2. A dispenser as claimed in claim 1 for a container that has a single outlet, the dispenser being mountable at that outlet such that any fluid leaving the container is directed into the inlet of the dispenser.

3. A dispenser as claimed in claim 1 or 2 wherein the outlet comprises an elongate mouth, with a section of deformable elastomeric material surrounding and defining the mouth.

4. A dispenser as claimed in claim 3 wherein each deformable elastomeric second material panel extends from the deformable elastomeric material section for a discrete distance into the wall of stiff resilient first material.

5. A dispenser as claimed in claim 1 or 2 wherein the outlet is elongate, and two or more deformable elastomeric material panels are provided on either side of the outlet.

6. A dispenser as claimed in claim 5 wherein the deformable elastomeric material panels located on each side of the outlet are sized such that the wall of stiff resilient material located between each panel defines a finger, each finger being adapted to flex outwardly to open the outlet at the predetermined pressure, and to move inwardly and close the outlet at a pressure less than the predetermined pressure.

7. A dispenser as claimed in claim 6 wherein each finger of the wall of stiff resilient material flares outwardly, from where it is connected to a remainder of the wall, to a finger distal end.

8. A dispenser as claimed in claim 6 wherein each finger of the wall of stiff resilient material further comprises a reinforcing rib extending along an inside surface thereof which is adapted to cause the finger to further bias closed the outlet, with the ridge also flexing at the predetermined pressure.

9. A dispenser as claimed in claim 8 wherein each rib has a shape that is transversely wider at its junction with the finger than at a distal rib base to thereby form a V-shape in cross-section, and each rib is wider towards the distal end of each finger, with opposing walls of the rib converging, moving from the finger distal end towards the dispenser inlet.

10. A dispenser as claimed in claim 1 or 2 wherein the outlet is elongate, and the deformable elastomeric material panels are defined to extend from opposite ends of the outlet for a discrete distance into the wall of stiff resilient material.

11. A dispenser as claimed in claim 1 or 2 wherein the first stiff resilient material and the second deformable elastomeric material are first and second, different, polymers, with the dispenser being formed by co-moulding or bi-moulding the first stiff resilient material with the second deformable elastomeric material.

12. A dispenser as claimed in claim 1 or 2 wherein the deformable elastomeric material is a thermoplastic or thermoset elastomer-rubber or another flexible/deformable elastomer, and the stiff resilient material is a thermoplastic or thermoset polymer having greater strength and resiliency than the deformable elastomeric material.

13. A dispenser as claimed in claim 1 or 2 wherein the deformable elastomeric material is a thermoplastic polyurethane, and the stiff resilient material is a nylon (polyamide), a polyethylene, a polypropylene, a polyethylene terephthalate, a polybutylene terephthalate, or another resilient stiff or rigid polymer compared to the deformable elastomeric material.

14. A dispenser as claimed in claim 1 or 2 wherein the outlet comprises a slit extending across a thin end of the dispenser.

15. A dispenser as claimed in claim 1 or 2 that tapers downwardly from the inlet to outlet.

16. A dispenser as claimed in claim 1 or 2 that is adapted for mounting to an open end of a container in the form of a pliable or rigid tube or bottle.

17. A dispenser as claimed in claim 16 wherein the inlet of the dispenser is circular for affixing to an open circular end of the tube or bottle.

18. A dispenser as claimed in claim 16 wherein the inlet is attached to the open end of the tube or bottle by welding, adhesive, screw-mounting and/or push, interference or snap-fitting.

19. A dispenser as claimed in claim 16 wherein in use the dispenser receives the fluid out of the tube or bottle open end when the tube or bottle is squeezed, pressed or pressured internally.

20. A dispenser as claimed in claim 19 wherein the predetermined pressure is applied to the fluid at the dispenser outlet as a result of the tube or bottle being squeezed, pressed or internally pressured, with the predetermined pressure releasing when the squeezing, pressing or pressuring of the tube or bottle is released.

21. A dispenser as claimed in claim 1 or 2 wherein a strip of material is frangibly connected to the outlet to seal the same prior to use, the removal of the strip enabling the outlet to open in use.

22. A dispenser as claimed in claim 21 wherein, when the outlet is elongate, the strip of material is a tear strip frangibly connected along the length of the outlet and detachable therefrom by a manual pulling action initiated at a protruding end of the strip, with the removal of the strip exposing the outlet for use.

23. A dispenser as claimed in claim 21 wherein the strip of material is formed from the same deformable elastomeric material as each panel, such that the strip can be co-moulded or bi-moulded when forming the deformable elastomeric material panel.

24. A dispenser as claimed in claim 1 or 2, that is adapted for use and operation with a viscous fluid such as toothpaste.

* * * * *